US012739718B2

(12) United States Patent
Li et al.

(10) Patent No.: US 12,739,718 B2
(45) Date of Patent: Sep. 15, 2026

(54) PDCCH MONITORING METHOD AND DEVICES

(71) Applicant: GUANGDONG OPPO MOBILE TELECOMMUNICATIONS CORP., LTD., Dongguan (CN)

(72) Inventors: Haitao Li, Dongguan (CN); Xin You, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 299 days.

(21) Appl. No.: 18/396,465

(22) Filed: Dec. 26, 2023

(65) Prior Publication Data

US 2024/0137827 A1 Apr. 25, 2024

Related U.S. Application Data

(63) Continuation of application No. PCT/CN2021/108259, filed on Jul. 23, 2021.

(51) Int. Cl.
*H04W 36/08* (2009.01)
*H04L 5/00* (2006.01)

(52) U.S. Cl.
CPC ........... *H04W 36/08* (2013.01); *H04L 5/0053* (2013.01)

(58) Field of Classification Search
CPC ............................ H04W 36/08; H04L 5/0053
USPC ........................................................ 370/331
See application file for complete search history.

(56) References Cited

U.S. PATENT DOCUMENTS 11,412,422 B2 * 8/2022 Rastegardoost ...... H04W 36/08
11,483,859 B2 * 10/2022 Rastegardoost ...... H04L 5/0051
11,632,804 B2 * 4/2023 Mukherjee ........... H04L 5/0048 370/329
11,689,977 B2 * 6/2023 Sharma ............ H04W 36/0061 370/331
11,864,031 B2 * 1/2024 Tsai ...................... H04W 72/23
11,864,186 B2 * 1/2024 Zhou ..................... H04L 5/0053
11,902,877 B2 * 2/2024 Guo ...................... H04W 40/36
12,004,026 B2 * 6/2024 Kung ...................... H04L 5/001

(Continued)

FOREIGN PATENT DOCUMENTS

CN 111148259 A 5/2020
CN 111817835 A 10/2020

(Continued)

OTHER PUBLICATIONS

Supplementary European Search Report in the European application No. 21950583.1, mailed on Jul. 2, 2024, 8 pages.

(Continued)

*Primary Examiner* — Melvin H Pollack
(74) *Attorney, Agent, or Firm* — BAYES PLLC

(57) ABSTRACT

A method for monitoring a Physical Downlink Control Channel (PDCCH), including: a handover command transmitted by a first network device is received, wherein the handover command is used to instruct the terminal device to switch from a first cell corresponding to the first network device to a second cell corresponding to a second network device; and a PDCCH transmitted by the second network device is monitored based on a Control Resource Set (CORESET) associated with a target Bandwidth Part (BWP) of the second cell.

20 Claims, 15 Drawing Sheets

(56) References Cited

U.S. PATENT DOCUMENTS 12,041,637 B2 * 7/2024 Liu ........................ H04L 5/0055
12,120,564 B2 * 10/2024 Cui .................... H04B 7/06966
12,156,230 B2 * 11/2024 Takahashi ............. H04W 72/23
12,170,563 B2 * 12/2024 Wang ................... H04B 7/0695
12,177,781 B2 * 12/2024 Wu ...................... H04L 5/0094
12,185,326 B2 * 12/2024 Liu ...................... H04W 72/23
12,192,015 B2 * 1/2025 Xiong ................. H04W 74/004
12,206,480 B2 * 1/2025 Kang .................... H04L 5/0035
12,207,311 B2 * 1/2025 Agiwal ................. H04W 76/30
12,212,399 B2 * 1/2025 Ye ...................... H04B 7/18563
12,213,170 B2 * 1/2025 Kim .................. H04W 56/0045
12,219,408 B2 * 2/2025 Lim .................. H04W 36/0061
12,238,025 B2 * 2/2025 Zhang ................... H04L 5/0053
12,245,244 B2 * 3/2025 Yu ......................... H04W 72/23
12,245,295 B2 * 3/2025 Jung ................. H04W 74/0841
12,309,720 B2 * 5/2025 Zhou ................... H04W 56/001
12,309,813 B2 * 5/2025 Manolakos ........... H04W 64/00
12,317,325 B2 * 5/2025 Lim .................. H04W 72/1268
12,323,817 B2 * 6/2025 Da Silva ............. H04W 36/249
12,342,228 B2 * 6/2025 Hori ...................... H04W 76/22
12,375,155 B2 * 7/2025 Zeineddine ........... H04L 1/0026
12,376,178 B2 * 7/2025 Raghavan ............. H04W 76/20
12,382,353 B2 * 8/2025 Kim ...................... H04W 76/18
12,402,143 B2 * 8/2025 Cirik ..................... H04W 72/23
12,418,337 B2 * 9/2025 Kwak ................... H04L 5/0053
12,425,156 B2 * 9/2025 Seo ........................... H04L 1/00
12,432,594 B2 * 9/2025 Wang ..................... H04B 17/24
2019/0297547 A1 9/2019 Tsai
2019/0357092 A1 11/2019 Jung et al.
2020/0351818 A1 11/2020 Park
2021/0204178 A1 7/2021 Jung et al.
2021/0250156 A1 * 8/2021 Kim ...................... H04W 72/23
2021/0298029 A1 * 9/2021 Liu ................... H04W 72/0453
2022/0046580 A1 2/2022 Park
2022/0377732 A1 * 11/2022 Yang ..................... H04W 72/27
2023/0041310 A1 * 2/2023 Kim ...................... H04W 72/21
2023/0247501 A1 * 8/2023 Kim .................. H04W 74/0833
370/331
2023/0388869 A1 11/2023 Jung et al.
2024/0187200 A1 * 6/2024 Zhou ..................... H04L 5/0053
2024/0306053 A1 * 9/2024 Matsumura ....... H04W 36/0072
2025/0071854 A1 * 2/2025 Cirik ..................... H04L 5/0091

FOREIGN PATENT DOCUMENTS

EP 3857807 A1 8/2021
EP 3860214 A1 * 8/2021 ............ H04W 72/53
EP 3920602 A1 * 12/2021 ............ H04W 72/23
EP 3927055 A1 * 12/2021 ............ H04W 72/23
EP 4329234 A2 * 2/2024 ........ H04W 72/0453
KR 20210071036 A 6/2021
WO WO-2022007930 A1 * 1/2022 ........... H04L 5/0098

OTHER PUBLICATIONS

Nokia etal, "Corrections to CORESET and PDCCH TCI state release", 3GPP TSG-RAN WG2 Meeting #110e R2-2004903, Elbonia, Jun. 1-11, 2020, section 2. 6 pages.

International Search Report in the international application No. PCT/CN2021/108259, mailed on Apr. 19, 2022. 5 pages with English translation.

Written Opinion of the International Search Authority in the international application No. PCT/CN2021/108259, mailed on Apr. 19, 2022. 6 pages with English translation.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.8.0 (Dec. 2019), section 10.1.2.1. 365 pages.

* cited by examiner

PDCCH MONITORING METHOD AND DEVICES

CROSS REFERENCE TO RELATED APPLICATION

This is a continuation of International Application No. PCT/CN2021/108259 filed on Jul. 23, 2021, the contents of which is hereby incorporated by reference in its entirety.

TECHNICAL FIELD

Embodiments of the present disclosure relate to the field of the communication technologies, in particular to a method for monitoring a Physical Downlink Control Channel (PDCCH), and devices

BACKGROUND

In a cell handover scenario of a terminal device, in some handover modes, the terminal device monitors a PDCCH of a target cell, waits for the target cell to schedule uplink transmission, and transmits a handover completion message by using the scheduled uplink resources.

At present, the method for monitoring the PDCCH needs to be further studied.

DETAILED DESCRIPTION

In order to make the object, technical solutions and advantages of the present disclosure clearer, the embodiments of the present disclosure will be described in further detail below with reference to the drawings.

The network architecture and service scenario described by the embodiment of the present disclosure are intended to more clearly explain the technical solutions of the embodiments of the present disclosure, and do not constitute a limitation to the technical solutions provided by the embodiments of the present disclosure. Ordinary technical personnel in the field can see that with the evolution of the network architecture and the emergence of new service scenarios, the technical solutions provided by the embodiments of the present disclosure are equally applicable to similar technical problems.

Figure 1:
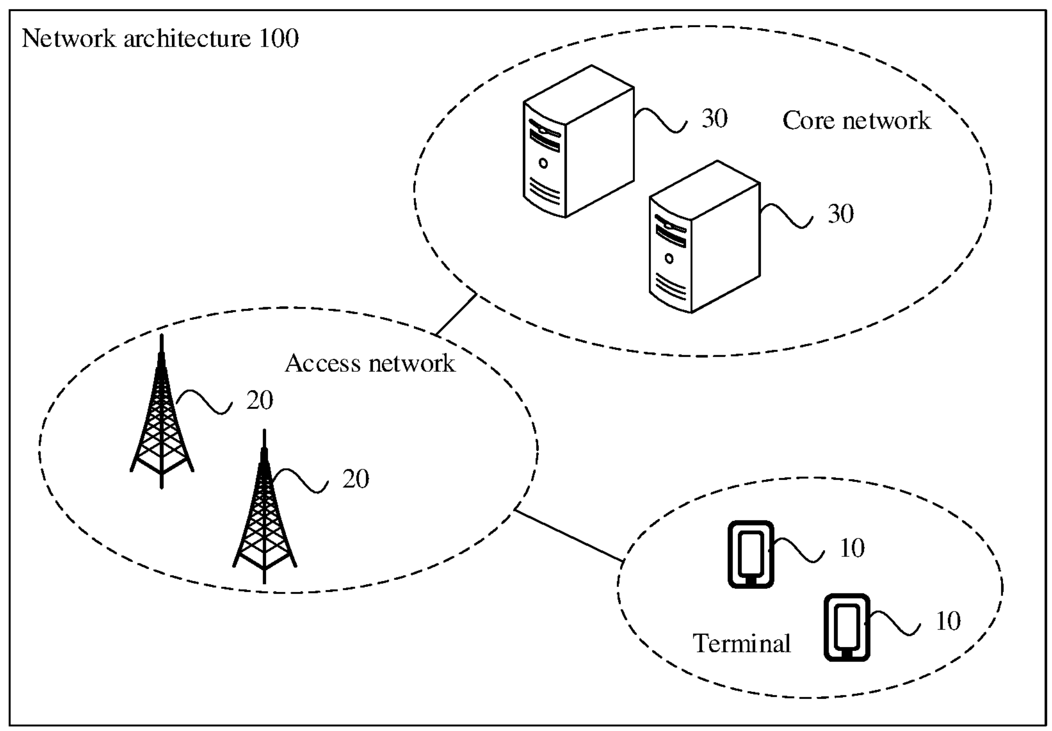
FIG. 1 is a schematic diagram of a network architecture provided by an embodiment of the present disclosure.

Referring to FIG. 1, FIG. 1 is a schematic diagram of a network architecture provided by an embodiment of the present disclosure. The network architecture may include a terminal device 10, an access network device 20 and a core network device 30.

The terminal device 10 may refer to User Equipment (UE), an access terminal, a subscriber unit, a subscriber station, a mobile station, a mobile stage, a remote station, a remote terminal, a mobile device, a wireless communication device, a user agent, or a user device. Alternatively, the terminal device 10 may also be a cellular telephone, a cordless telephone, a Session Initiation Protocol (SIP) telephone, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5th Generation System (5GS) or a terminal device in a future evolved Public Land Mobile Network (PLMN), etc. The embodiments of the present disclosure are not limited thereto. For convenience of description, the devices mentioned above are collectively referred to as the terminal device. The number of the terminal devices 10 is typically multiple and one or more terminal devices 10 may be distributed within the cell managed by each access network device 20.

The access network device 20 is a device deployed in an access network to provide a wireless communication function for the terminal device 10. The access network device 20 may include various forms of macro base stations, micro base stations, relay stations, access points and the like. In systems with different wireless access technologies, the name of the device with access network device function may be different, for example, in 5G NR systems, it is called a gNodeB or gNB. With the evolution of communication technology, the name "access network device" may be changed. For convenience of description, in the embodiments of the present disclosure, the above devices providing the wireless communication function for the terminal device 10 are collectively referred to as access network devices. Alternatively, a communication relationship may be established between the terminal device 10 and the core network device 30 through the access network device 20. Exemplarily, in a Long Term Evolution (LTE) system, the access network device 20 may be an Evolved Universal Terrestrial Radio Access Network (EUTRAN) or one or more eNodeBs in the EUTRAN. In the NR system, the access network device 20 may be a Radio Access Network (RAN) or one or more gNBs in the RAN. In the embodiments of the present disclosure, the network device refers to the access network device 20, except as specified.

The function of the core network device 30 is mainly to provide user connection and user management, to complete the bearing of services, and to provide an interface to an external network as a bearer network. For example, a core network device in a 5G NR system may include devices such as an Access and Mobility Management Function (AMF) entity, a User Plane Function (UPF) entity, and a Session Management Function (SMF) entity.

In one example, the access network device 20 and the core network device 30 communicate with each other through some air interface technologies, such as an NG interface in a 5G NR system. The access network device 20 and the terminal 10 communicate with each other through some air interface technologies, such as a Uu interface.

The "5G NR system" in embodiments of the present disclosure may also be referred to as a 5G system or an NR system, but the meaning thereof will be understood by those skilled in the art. The technical solutions described in the embodiments of the present disclosure may be applied to the 5G NR system, and may also be applied to the subsequent evolution system of the 5G NR system.

The UE and the terminal device in the embodiments of the preset disclosure express the same meaning, and they can be replaced with each other. The network device and the access network device express the same meaning, and they can be replaced with each other.

The communication system usually supports the handover procedure of a terminal device in a connected state. When a user who is using the network service moves from one cell to another cell, or because of the load adjustment of wireless transmission service, a maintenance of an activation operation, device failure and other reasons, in order to ensure the continuity of communication and the quality of service, the system transfers the communication link between the user and the original cell to the new cell, that is, performs the handover procedure. Thus, the terminal device may be switched from a cell of the first network device to a cell of the second network device. In this case, the first network device may be referred to as a source network device, a source access network device, or a source base station, and the second network device may be referred to as a target network device, a target access network device, or a target base station.

Before introducing the technical solutions of the present disclosure, the RRC protocol is introduced and explained firstly.

The functions of RRC protocol include: broadcasting system information, RRC connection control, transferring of Radio Access Types (RATs), measurement configuration and reporting, general protocol error handling, self-configuration and self-optimization, and so on.

In an NR system, RRC states include an RRC_CONNECTED state, an RRC_IDLE state, and an RRC_INACTIVE state.

The RRC_IDLE state is used to control the radio resource and radio channel when the terminal device establishes a connection request with its own high layer configuration. The operations supported by the RRC_IDLE state include cell reselection, paging of mobile termination data initiated by a 5G Core Network (5GC), paging broadcast system messages of a mobile termination data area managed by the 5GC, a Public Land Mobile Network (PLMN), and the like. The paging is initiated by the Core Network (CN), and the paging area is configured by the CN. There is no UE Access Stratum (AS) context on the network device side. The terminal device in the RRC_IDLE state is characterized in that the terminal device does not retain an RRC Context, and the terminal device does not establish an RRC connection with the network device. The RRC context includes the parameters in the interface message of the terminal device, and the specific content of the RRC context is determined by the behavior of the terminal device and the network device. The terminal device in the RRC_IDLE state has no data to be transmitted, and will enter a dormant state. The transceiver unit is turned off to reduce power consumption. The terminal device in the RRC_IDLE state is waked up only periodically to receive possible paging messages, i.e. discontinuous reception.

The RRC_CONNECTED state is used to establish the RRC connection between the terminal device and the network device and perform data transmission. The operations supported by the RRC_CONNECTED state include storing the AS context of the terminal device in the terminal device and the network device, and performing unicast data transmission from the terminal device, etc. The terminal device in the RRC_CONNECTED state has established the RRC context, and all the parameters necessary for establishing the communication between the terminal device and the network device are known by both parties. The network device allocates a Cell-Radio Network Temporary Identifier (C-RNTI) to the accessed terminal device, and the terminal device and the network device are in the CM_CONNECTED (Connection Management) state together. At this time, if the terminal device is transmitting data, the terminal device is in a continuous reception state. The terminal device enters the waiting state until the data transmission is completed, and switches to the Discontinuous Reception (DRX) connection state to save power consumption. When the terminal device has data to be transmitted, the terminal device switches back to the continuous reception state.

RRC_INACTIVE is a new RRC state defined in the 5G NR network environment for the purpose of reducing air interface signaling overhead, quickly restoring wireless connection and data service. When the terminal device is in the RRC_INACTIVE state, the RRC context is retained between the terminal device and one network device. One network device refers to any one of all network devices connected with the terminal device, and the terminal device and the core network are in the CM_CONNECTED state. At this time, the process of switching the terminal device to the connection state with the network device for data reception is relatively fast, no additional signaling overhead is generated, and the terminal device in the RRC_INACTIVE state will enter the dormant state, thus reducing power consumption.

Figure 2:
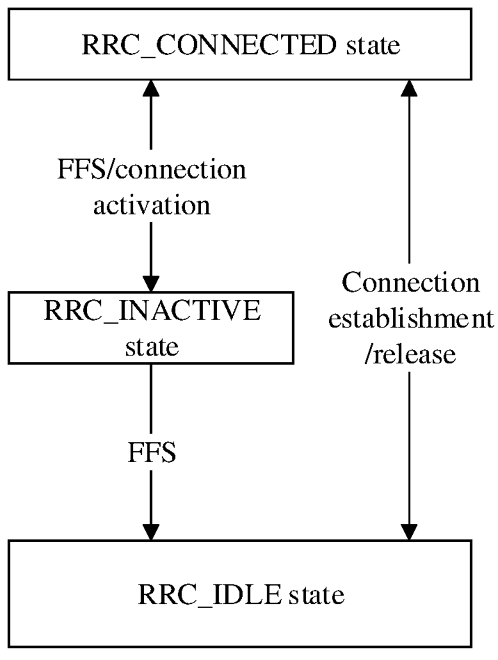
FIG. 2 exemplarily illustrates a schematic diagram of a handover relationship between Radio Resource Control (RRC) states in a New Radio (NR) system.

As illustrated in FIG. 2, FIG. 2 illustrates a schematic diagram of a handover relationship between RRC states in an NR system.

There is a bidirectional handover relationship between the RRC_IDLE state and the RRC_CONNECTED state. The RRC_IDLE state is switched to the RRC_CONNECTED state by establishing a new connection, and the RRC_CONNECTED state is switched to the RRC_IDLE state by releasing the resources of the terminal device. There is also a bidirectional handover relationship between the RRC_INACTIVE state and the RRC_CONNECTED state. The RRC_INACTIVE state is switched to the RRC_CONNECTED state by establishing a connection, and the RRC- _CONNECTED state is switched to the RRC_INACTIVE state by deactivation. There is no bidirectional handover relationship between the RRC_IDLE state and the RRC_INACTIVE state. The RRC_INACTIVE state may be switched to the RRC_IDLE state, and the specific process is in the For Further Study (FFS) state.

In addition, the difference among the RRC_IDLE state, the RRC_CONNECTED state, and the RRC_INACTIVE state lies in the management aspect of the mobility. The mobility of the RRC_IDLE state or the RRC_INACTIVE state is realized based on a cell reselection of the terminal device, and the mobility of the RRC_CONNECTED state is realized by the network side based on measurement.

Figure 3:
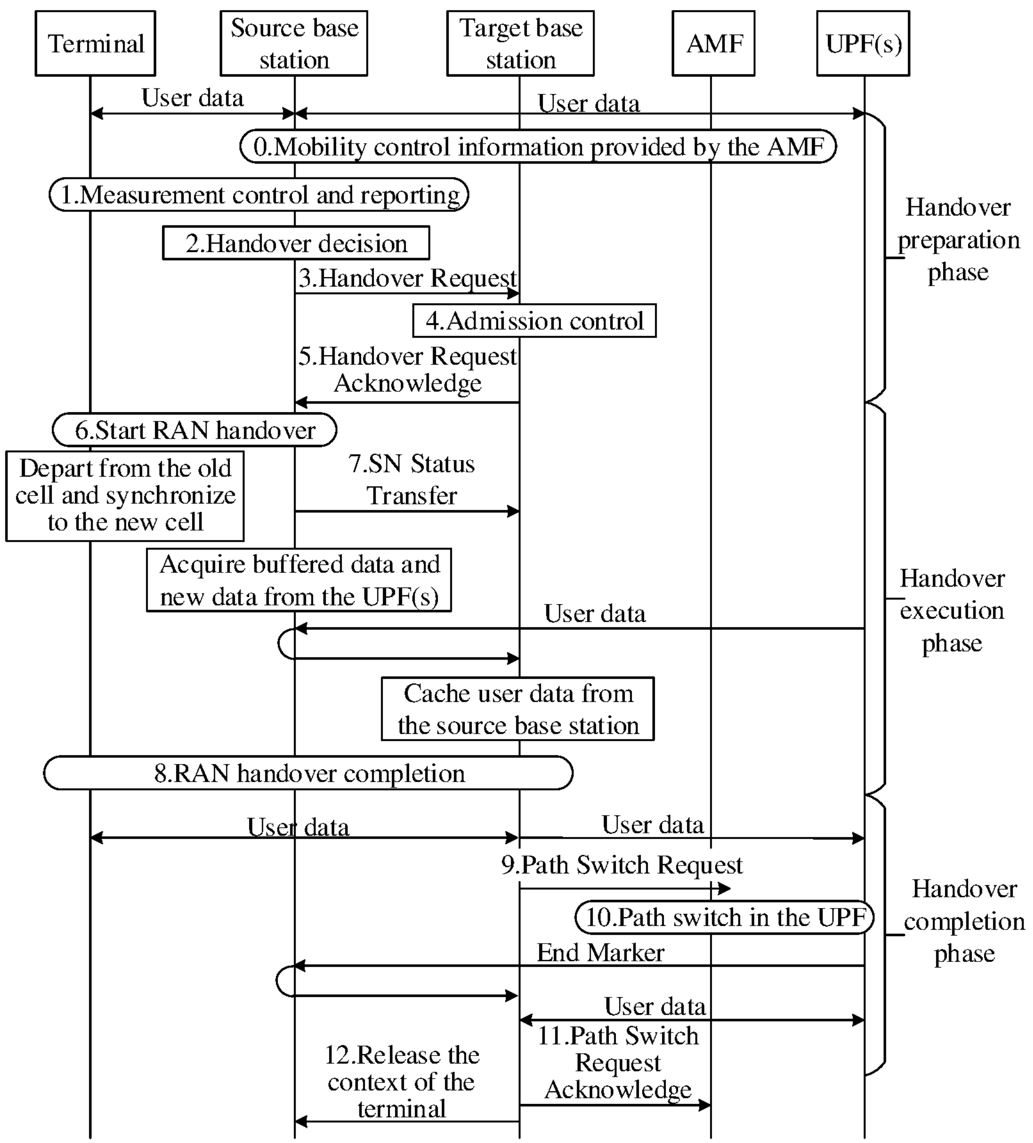
FIG. 3 exemplarily illustrates a schematic diagram of a cell handover procedure in an NR system.

Referring to FIG. 3, FIG. 3 illustrates a schematic diagram of a handover procedure of the terminal in an NR system.

When the terminal device is in a mobile state, the signal quality of the serving cell may deteriorate. The terminal device connects with the cell with better signal quality through the handover procedure to ensure that the terminal device has a continuous and uninterrupted communication service.

When a user who is using the network service moves from one cell to another cell, or because of the load adjustment of wireless transmission service, a maintenance of an activation operation, device failure and other reasons, in order to ensure the continuity of communication and the quality of service, the system transfers the communication link between the terminal device and the original cell to the new cell, that is, performs the handover procedure.

Taking a handover procedure of the Xn interface as an example, the whole handover procedure is divided into the following three phases.

In the handover preparation phase, the AMF provides mobility control information to the base station, and measurement control and reporting are performed between the terminal device and the source base station. After making a handover decision according to the measurement report of the terminal device, the source base station transmits a Handover Request to the target base station. The target base station performs admission control and transmits a Handover Request Acknowledge to the source base station when it is determined that handover of the terminal device is allowed.

In the handover execution phase, the Radio Access Network (RAN) handover is started, and the terminal device is departed from the old cell and synchronized to the new cell. The source base station transmits a Serial Number (SN) Status Transfer to the target base station. The source base station acquires buffered data and new data from the UPF, and then the RAN transmits user data to the target base station. The target base station caches user data from the source base station. At this point, the RAN handover is completed.

In the handover completion phase, the target base station transmits a Path Switch Request to the AMF, the AMF and the UPF perform path switch, and then the UPF transmits an End Marker to the source base station, and the source base station forwards the End Marker to the target base station. The AMF transmits a Path Switch Request Acknowledge to the target base station, and the target base station instructs the source base station to release the context information of the terminal device.

For the handover procedure illustrated in FIG. 3, in the network implementation, the source base station may simultaneously or successively initiate handover preparation/request messages for multiple target cells according to the measurement reports (including the measurement results of multiple cells) from the terminal device side (which may be based on the directly connected X2/Xn interface or through the S1/N2 interface with a Mobility Management Entity (MME)/AMF). After receiving the handover preparation/request message, each target cell performs access control according to its own Radio Resource Management (RRM) algorithm, and transmits a handover request acknowledge message to the base station where the source cell is located on the premise that the access control is passed (if the access control fails, it responds to a handover request failure message). The handover request acknowledge message carries a handover command generated by the target cell. The source base station selects one of the multiple target cells returning the handover acknowledge as the final handover target cell according to its own RRM algorithm, and transmits the handover command corresponding to the target cell to the terminal device through an RRC reconfiguration message, thus realizing the complete control of the network to the handover procedure.

The handover procedure of terminal device may be divided into two types: soft handover and hard handover. The hard handover is a handover procedure in which terminal device disconnects from source cell and then establishes connection with the target cell under the condition that the carrier frequencies of source cell and target cell are different. The soft handover is a handover procedure in which the terminal device first establishes a stable connection with the target cell and then disconnects with the source cell under the condition that the carrier frequencies of the source cell and the target cell are the same. The soft handover can reduce the occurrence of call dropping and improve the quality of service of users.

The BWP in the NR system is introduced below.

In the NR system, the minimum bandwidth is 5 MHz and the maximum bandwidth is 400 MHz. The maximum bandwidth is also called a Wideband Carrier. The terminal device operating on the Wideband Carrier will produce greater power consumption, and terminal device operating on the Wideband Carrier needs higher performance, which will increase the cost of the terminal device. The concept of BWP is introduced in the NR system. The BWP is a set of continuous Common Resource Blocks (CRBs) for a Sub-Carrier Space (SCS) in a part of the bandwidth of a carrier. Each BWP has its own unique bandwidth and frequency point, and SCSs and Synchronization Signal and PBCH Block (SSB) periods of different BWPs may also be configured differently. The network device may allocate different BWPs to the terminal device according to requirements of the terminal device at different moments. The BWP is also called bandwidth adaptive variation.

Figure 4:
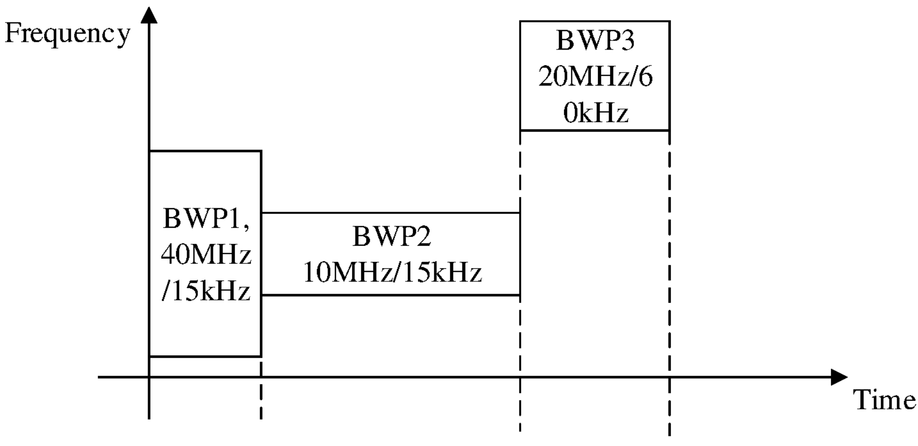
FIG. 4 exemplarily illustrates a schematic diagram of an adaptive variation process of a bandwidth in an NR system.

Referring to FIG. 4, FIG. 4 exemplarily illustrates an adaptive variation process of a bandwidth in an NR system.

At a first moment, the traffic volume of the terminal device is large, and the NR system configures BWP 1 with large bandwidth for the terminal device. At a second moment, the traffic volume of the terminal device is small, and the system configures BWP 2 with small bandwidth for the terminal device. The BWP 2 can meet the communication requirements of the terminal device at this time. At a third moment, the system detects that there is selective fading of a large range of frequencies in the bandwidth where the BWP 1 is located, or resources are scarce in the frequency range where the BWP 1 is located, the system configures a new bandwidth BWP 3 for the terminal device.

The BWP of the terminal device is divided into the Uplink BWP (UL BWP) and the Downlink BWP (DL BWP) according to the transmission direction. The network configures at most four UL BWPs and four DL BWPs for the terminal device in the RRC_CONNECTED state, and the terminal device in the RRC_CONNECTED state has at most one active UL BWP and one active DL BWP at one moment.

In frequency division duplex system (also called full duplex system), the communication between the terminal device and the network device needs two independent channels. One channel is used to transmit messages downwards, the other channel is used to transmit messages upwards, and the two channels do not affect each other, so there is no explicit association relationship between the UL BWP and the DL BWP. One of the UL BWP and DL BWP changes and the other of the UL BWP and DL BWP is not affected. For example, the network configures four UL BWPs for the terminal device. The indexes of the four UL BWPs are 0, 1, 2 and 3 respectively. The indexes of the four DL BWPs are 0, 1, 2 and 3 respectively. At a certain moment, the index of the active UL BWP is 0, the index of the active DL BWP is 1, and the DL BWP is switched by Downlink Control Information (DCI) instruction. After switching, the index of the DL BWP becomes 2, and the index of the UL BWP is 0, which remains unchanged.

Next, the configuration of the PDCCH in a NR system is introduced.

The PDCCH mainly carries DCI information of a Physical Uplink Control Channel (PUCCH) and a Physical Uplink Share Channel (PUSCH). The PDCCH may be divided into common control information (common search space) and dedicated control information (dedicated search space) according to different action scopes. The common control information and the dedicated control information define the starting position of the blind detection by the terminal device and the channel search mode. The terminal device monitors the PDCCH at a predetermined position in the search space and performs blind detection. Different terminal devices distinguish their own PDCCHs through Radio Network Temporary Identity (RNTI) information.

The terminal device monitors the PDCCH on the PDCCH search space configured by the network. Each DL BWP of the UE is configured with at most 10 PDCCH search spaces, and each PDCCH search space is associated with a CORESET. The network may configure at most 3 CORESETs for each DL BWP of the terminal device and configure a TCI state set for each CORESET. At a certain moment, only one TCI state in an active state can exist in a TCI state set. The terminal device receives the PDCCH by using the active TCI state of the CORESET corresponding to the search space. In particular, since there is no TCI state set corresponding to the CORESET of the initial BWP, the system message broadcast or handover command configures a CORESET #0 for the initial BWP, and the terminal device needs to monitor the PDCCH on all SSBs.

Figure 5:
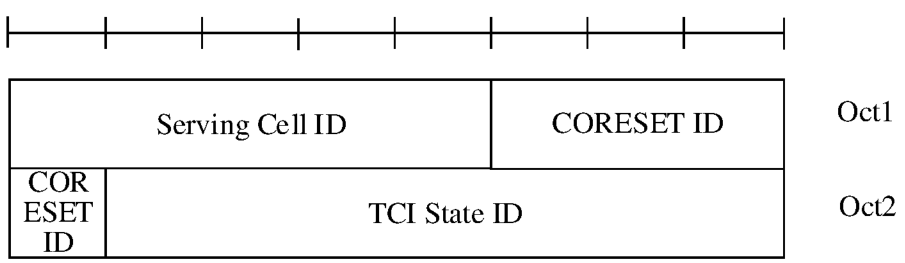
FIG. 5 exemplarily illustrates a schematic diagram of a Medium Access Control (MAC) Control Element (CE) format for indicating a Transmission Configuration Indicator (TCI) state corresponding to a PDCCH.

Referring to FIG. 5, FIG. 5 illustrates a format of MAC CE dedicated to a terminal for indicating a TCI state corresponding to a PDCCH.

Next, the beam management mechanism in the NR is introduced.

The NR system introduces the beam management mechanism to support multi-beam operation. The beam management mechanism includes beam sweeping, beam measurement, beam determination and beam reporting.

(1) Beam sweeping: in a specific period or time period, the beam is transmitted and/or received in a preset manner to cover a specific spatial area.

(2) Beam measurement refers to the process of measuring the quality and characteristics of the received beamforming signals by the terminal device or the network device. In the process of beam management, the terminal device or network device identifies the best beam through relevant measurements.

(3) Beam determination: the terminal device or the network device selects the beam resource with the best signal quality.

(4) Beam reporting: After determining the beam resource with the best signal quality, the terminal device or the network device notifies the selected beam information to the opposite end.

In order to support multi-beam operation, the 5G uses the beam management mechanism, which may be used for initial access, control channel and data channel.

Random Access Channel-less (RACH-less) Handover (HO) is described below.

In the LTE system, for a specific scenario, for example, in a scenario where the target cell determines that the Timing Advance (TA) from the terminal device to the source cell is the same as that from the terminal device to the target cell, or the TA from the terminal device to the target cell is 0, the target cell may configure RACH-skip information in the handover command, that is, the handover procedure may be a RACH-less HO. The RACH-skip information may contain the uplink resource of the target cell accessed by the terminal device for the terminal device to transmit the handover completion message. If no uplink resource is configured in the handover command, the terminal device needs to monitor the PDCCH of the target cell, wait for the target cell to schedule uplink transmission, and transmit the handover completion message by using the scheduled uplink resource.

In the LTE system, because there is no beamforming, the terminal device performs the RACH-less handover procedure, and the behavior of monitoring PDCCH of the target cell is relatively simple.

In the NR system, due to the introduction of beamforming, the PDCCH reception needs to refer to a specific SSB or a Channel State Information-Reference Signal (CSI-RS), that is, the terminal device uses the active TCI state of the PDCCH to receive the PDCCH. However, at present, the terminal device cannot determine which TCI states are used to receive the PDCCH based on the handover command, which may make the terminal device unable to obtain an available uplink resource after handover and unable to transmit the handover completion message, and may cause the handover failure.

Next, the technical solutions of the present disclosure will be described by several exemplary embodiments.

Figure 6:
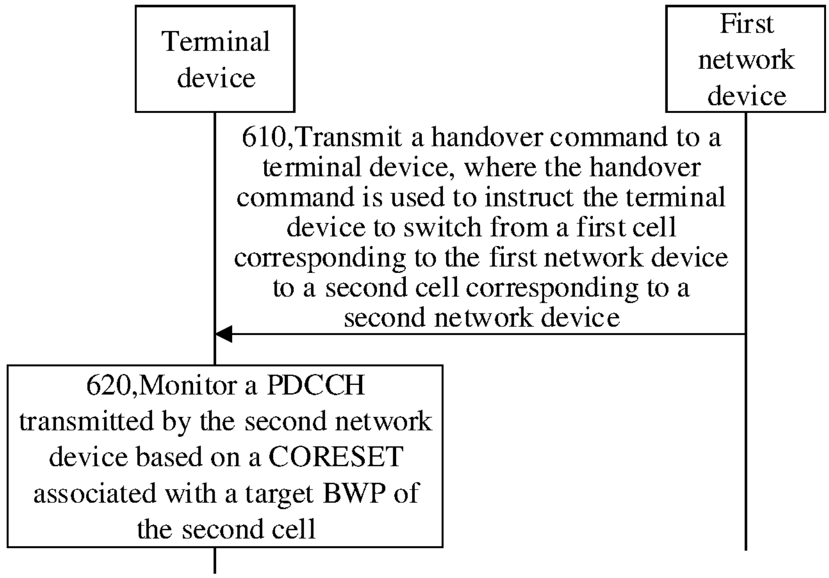
FIG. 6 is a flowchart of a method for monitoring a PDCCH according to an embodiment of the present disclosure.

Referring to FIG. 6, FIG. 6 illustrates a flowchart of a method for monitoring a PDCCH provided by an embodiment of the present disclosure. The method may be applied to the network architecture illustrated in FIG. 1. The method may include the following operations (610-620).

In operation 610, a first network device transmits a handover command to a terminal device. The handover command is used to instruct the terminal device to switch from a first cell corresponding to the first network device to a second cell corresponding to a second network device.

Accordingly, the terminal device receives the handover command transmitted by the first network device.

The terminal device may be any terminal device, for example, the terminal device in the present disclosure may be any device in the NR system that can monitor the PDCCH. Of course, the technical solutions of the present disclosure are not limited to the application in the NR system, but may also be applied in the LTE system, or other subsequent evolved communication systems.

The first network device is a network device that establishes a connection with the terminal device. The first network device is also referred to as a source network device or a source base station. The first cell is a physical area, with the first network device as the center, and divided in an area covered by signals based on information such as carrier frequency and scrambling code. The terminal device establishes connection with the first network device in the first cell. The first network device may have at least one cell, the first cell may be one of the above at least one cell, and the first cell is also referred to as a source cell or a serving cell.

The second network device is a network device that is about to establish a connection after the terminal device performs the handover procedure, also known as a target network device or a target base station. The second cell is a physical area, with the second network device as the center, and divided in an area covered by signals based on information such as carrier frequency and scrambling code. The second network device may have at least one cell, the second cell may be one of the above at least one cell, and the second cell is also referred to as a target cell.

Alternatively, the first network device and the second network device are two different network devices, or the first network device and the second network device may also be the same network device. For example, when the first cell and the second cell belong to the same network device, the first network device and the second network device are the same network device.

In this embodiment, for different environments, the reasons for the terminal device to switch from the first cell of the first network device to the second cell of the second network device include but are not limited to: the service signal quality of the first cell is too low, the first network device malfunctions, etc., which are not limited in the present disclosure.

Alternatively, the handover command is a RACH-less handover command. The RACH-less handover command is configured to instruct the terminal device to perform a RACH-less handover procedure.

Alternatively, the first network device transmits an RRC message to the terminal device, and the terminal device receives the RRC message transmitted by the first network device. The RRC message includes information for instructing the terminal device to perform the RACH-less handover procedure. Alternatively, the RRC message is an RRC reconfiguration message containing ReconfigurationWithSync, which represents the handover command. The handover command may be generated by the second network device and forwarded by the first network device.

Alternatively, the above information for instructing the terminal device to perform the RACH-less handover procedure may be a RACH-less handover identification or RACH-skip information. The terminal device can be informed to perform the RACH-less handover procedure according to the RACH-less handover identification or RACH-skip information.

In operation 620, the terminal device monitors a PDCCH transmitted by the second network device based on a CORESET associated with a target BWP of the second cell.

After receiving the handover command, the terminal device determines the CORESET associated with the target BWP of the second cell according to the handover command. Alternatively, the target BWP of the second cell may be an initial BWP or an active BWP or a BWP in other states. Alternatively, the terminal device uses the TCI state corresponding to the CORESET associated with the target BWP to monitor the PDCCH transmitted by the second network device.

In an exemplary embodiment, the first network device transmits the handover command generated by the second network device, and the terminal device receives the handover command transmitted by the first network device. The terminal device determines the target BWP and its associated CORESET and/or other information based on the handover command, and determines the target receiving beam through the information. The terminal device monitors the PDCCH transmitted by the second network device by using the determined target receiving beam.

Alternatively, if a PDCCH scrambled by its own C-RNTI is monitored by the terminal device, the UL grant information is obtained from the PDCCH. A corresponding uplink resource is determined based on the UL grant information, and a handover completion message is transmitted to the second network device on the determined uplink resource. Alternatively, in a case that the handover command is transmitted by using an RRC reconfiguration message, the handover completion message may be an RRC reconfiguration completion message.

To sum up, in the technical solution provided by the embodiment of the present disclosure, after receiving the handover command, the terminal device monitors the PDCCH transmitted by the target cell based on the CORESET associated with the target BWP of the target cell, so that the terminal device can accurately monitor the PDCCH, thereby obtaining an available uplink resource from the PDCCH to transmit the handover completion message and improving the handover success rate.

Figure 7:
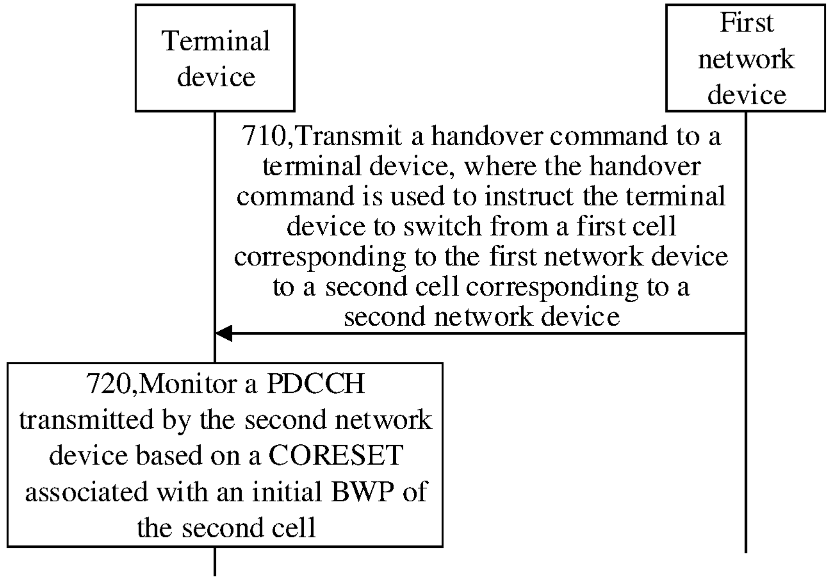
FIG. 7 is a flowchart of a method for monitoring a PDCCH according to another embodiment of the present disclosure.

Referring to FIG. 7, FIG. 7 is a flowchart of a method for monitoring a PDCCH provided by another embodiment of the present disclosure. This method may be applied to the network architecture illustrated in FIG. 1. The method may include the following operations (710-720).

In operation 710, a first network device transmits a handover command to a terminal device. The handover command is used to instruct the terminal device to switch from a first cell corresponding to the first network device to a second cell corresponding to a second network device.

Accordingly, the terminal device receives the handover command transmitted by the first network device.

Alternatively, the handover command is transmitted in the form of an RRC message, and the first network device transmits the RRC message (such as an RRC reconfiguration message) to the terminal device. The RRC message includes the handover command (such as ReconfigurationWithSync).

Alternatively, the handover command further includes information for instructing the terminal device to perform the RACH-less handover procedure, such as RACH-less handover identification or RACH-skip information.

Alternatively, the handover command further includes configuration information of an active BWP of the second cell. The configuration information of the active BWP indicates information such as the active BWP, at least one CORESET associated with the active BWP, and a respective TCI state set configured for each CORESET of the at least one CORESET, and the like.

Alternatively, the handover command further includes configuration information of an initial BWP of the second cell. The configuration information of the initial BWP indicates information such as the initial BWP and a CORESET associated with the initial BWP, and the like.

In operation 720, the terminal device monitors a PDCCH transmitted by the second network device based on a CORESET associated with an initial BWP of the second cell.

In this embodiment, the target BWP is the initial BWP of the second cell. Alternatively, the CORESET associated with the initial BWP is denoted CORESET #0. Alternatively, the terminal device determines the initial BWP of the second cell according to the handover command.

Alternatively, in a case that the handover command includes configuration information of the initial BWP of the second cell, the terminal device determines the initial BWP of the second cell based on the configuration information of the initial BWP of the second cell.

Alternatively, in a case that the handover command does not include configuration information of the initial BWP of the second cell, the terminal device determines the initial BWP of the first cell as the initial BWP of the second cell.

Alternatively, the configuration information such as the CORESET associated with the initial BWP of the second cell follows the Delta configuration principle, that is, the second cell uses a signaling to configure the updated configuration information of the second cell, and does not use a signaling to configure the non-updated configuration information of the second cell (the same configuration information for the first cell and the second cell). The first network device transmits a handover request to the second network device, the second network device receives the handover request, and determines the configuration information of the first cell of the first network device (such as a CORESET associated with the initial BWP of the first cell, etc.) based on the handover request. The second network device compares the configuration information of the second cell with the determined configuration information of the first cell. If there is different configuration information, the different configuration information is configured by a signaling. If there is no different configuration information, no signaling is used for configuring. The terminal device determines the configuration information such as the CORESET associated with the BWP of the second cell based on the handover command. If the terminal device does not receive part of the configuration information of the second cell, the terminal device uses the relevant configuration information of the first cell. If the terminal device receives the configuration information updated by the second cell, the terminal device updates the corresponding configuration information according to the signaling. The signaling consumption can be reduced by the Delta configuration principle and it is ensured that the terminal device can determine the CORESET associated with the initial BWP and other information.

In addition, since the CORESET associated with the initial BWP does not have a corresponding TCI state set, in one example, the terminal device receives the PDCCH transmitted by the second network device on all receiving beams of the terminal device by using a manner of beam sweeping in a case of determining that the PDCCH is monitored based on the CORESET associated with the initial BWP of the second cell. The above receiving beam is also called SSB beam, which refers to the beam used by receiving the SSB.

Because the bandwidths of the initial BWP and a CORESET associated with the initial BWP are relatively small, and the bandwidth of the low frequency band and the middle frequency band in the network is limited, there may be some limitations in network scheduling when the terminal device uses all the receiving beams to monitor PDCCH transmitted by the second network device. In another exemplary embodiment, in a case of determining that a PDCCH is monitored based on a CORESET associated with the initial BWP of the second cell, the terminal device determines at least one target receiving beam from all the receiving beams of the terminal device according to the beam measurement result, and receives the PDCCH transmitted by the second network device by using the at least one target receiving beam.

The terminal device obtains the beam measurement result through the beam sweeping and measurement process. The terminal device selects one or more target receiving beams through the beam measurement result, and monitors the PDCCH transmitted by the second network device by using the selected one or more target receiving beams.

The terminal device may determine the one or more target receiving beams for monitoring the PDCCH transmitted by the second network device according to the beam measurement result through some selection criteria. Alternatively, the standard for the terminal device to select the one or more target receiving beams according to the beam measurement result is to select the first n beams with the best signal quality as the one or more target receiving beams, where n is a positive integer. Alternatively, the standard for the terminal device to select the one or more target receiving beams according to the beam measurement result is to set a signal quality threshold X, and determine all beams whose signal quality exceeds X as the one or more target receiving beams by the terminal device according to the beam measurement result. In addition, the reference is made to the above description for the specific process of beam sweeping and beam measurement, which will not be repeated here.

In one embodiment, the first network device forwards the handover command generated by the second network device, the terminal device receives the handover command and determines the CORESET associated with the initial BWP of the second cell based on the handover command, the terminal device selects a receiving beam with the best signal quality as the target receiving beam according to the beam measurement result, and the terminal device uses the target receiving beam to monitor the PDCCH transmitted by the second network device.

In another embodiment, the first network device forwards the handover command generated by the second network device, the terminal device receives the handover command and determines the CORESET associated with the initial BWP of the second cell based on the handover command, the terminal device selects several beams whose signal quality is higher than a certain threshold as target receiving beams according to the beam measurement result, and the terminal device uses the target receiving beams to monitor the PDCCH transmitted by the second network device.

To sum up, in the technical solution provided by the embodiment, the terminal device monitors the PDCCH based on the CORESET associated with the initial BWP of the target cell, so that the modification for the RRC message can be reduced.

In addition, the terminal device determines the one or more target receiving beams through the beam measurement result and uses the determined one or more target receiving beams to monitor the PDCCH transmitted by the second network device. Compared with the terminal device using all the receiving beams to monitor the PDCCH, it is helpful to reduce the energy consumption in the monitoring process of the terminal device and achieve the purpose of saving power of the terminal.

The above embodiments describe the terminal device monitoring the PDCCH transmitted by the second network device based on the CORESET associated with the initial BWP of the second cell. In some other embodiments, the terminal device monitors the PDCCH transmitted by the second network device based on the CORESET associated with the active BWP of the second cell. This will be described below with reference to the two embodiments of FIG. 8 and FIG. 9.

Figure 8:
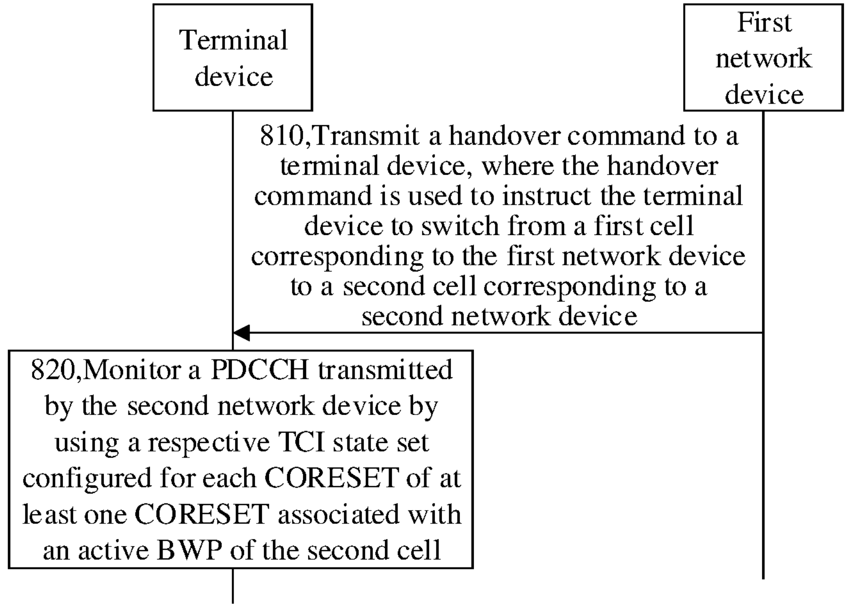
FIG. 8 is a flowchart of a method for monitoring a PDCCH according to another embodiment of the present disclosure.

Referring to FIG. 8, FIG. 8 illustrates a flowchart of a method for monitoring a PDCCH provided by another embodiment of the present disclosure. The method may be applied to the network architecture illustrated in FIG. 1. The method may include the following operations (810-820).

In operation 810, a first network device transmits a handover command to a terminal device. The handover command is used to instruct the terminal device to switch from a first cell corresponding to the first network device to a second cell corresponding to a second network device.

Accordingly, the terminal device receives the handover command transmitted by the first network device.

Alternatively, the handover command is transmitted in the form of an RRC message, and the first network device transmits the RRC message (such as an RRC reconfiguration message) to the terminal device. The RRC message includes the handover command (such as ReconfigurationWithSync).

Alternatively, the handover command further includes information for instructing the terminal device to perform the RACH-less handover procedure, such as RACH-less handover identification or RACH-skip information.

Alternatively, the handover command further includes configuration information of an active BWP of the second cell. The configuration information of the active BWP indicates information such as the active BWP, at least one CORESET associated with the active BWP, and a respective TCI state set configured for each CORESET of the at least one CORESET, and the like.

Alternatively, the handover command further includes configuration information of an initial BWP of the second cell. The configuration information of the initial BWP indicates information such as the initial BWP and a CORESET associated with the initial BWP, and the like.

In operation 820, the terminal device monitors a PDCCH transmitted by the second network device by using a respective TCI state set configured for each CORESET of at least one CORESET associated with an active BWP of the second cell.

In this embodiment, the target BWP is the active BWP of the second cell. Alternatively, the terminal device determines the active BWP of the second cell based on the handover command. For example, the terminal device determines the active BWP, at least one CORESET associated with the active BWP, and a respective TCI state set configured for each CORESET of the at least one CORESET based on the configuration information of the active BWP of the second cell contained in the handover command.

In one example, the behavior of the terminal device monitoring the PDCCH by using the above configured TCI state set is prescribed by the protocol. For example, if the handover command includes configuration information of the active BWP of the second cell, the terminal device monitors the PDCCH by using the configured TCI state set. Conversely, if the handover command does not include configuration information of the active BWP of the second cell, the terminal device cannot use the configured TCI state set to monitor the PDCCH.

In another example, the behavior of the terminal device monitors the PDCCH by using the above configured TCI state set is configured by the network. Alternatively, the handover command further includes first information, and the first information indicates whether the terminal device uses the configured TCI state set to monitor the PDCCH. If the first information in the handover command indicates that the terminal device uses the configured TCI state set to monitor the PDCCH, the terminal device uses the configured TCI state set to monitor the PDCCH. If the first information in the handover command indicates that the terminal device does not use the configured TCI state set to monitor the PDCCH, the terminal device does not use the configured TCI state set to monitor the PDCCH. The first information may be represented by 1 bit, for example, using the configured TCI state set is represented by 1, not using the configured TCI state set is represented by 0, or not using the configured TCI state set is represented by 1, using the configured TCI state set is represented by 0.

In addition, the number of CORESETs associated with the active BWP of the second cell may be one or more. When the number of CORESETs associated with the active BWP is one, the terminal device uses the respective TCI state set configured for the CORESET to monitor the PDCCH transmitted by the second network device. When the number of CORESETs associated with the active BWP is multiple (e.g., denoted as n, n being an integer greater than 1), the terminal device may use the TCI state sets corresponding to all of the n CORESETs to monitor the PDCCH transmitted by the second network device, or use the TCI state sets corresponding to a part of the n CORESETs to monitor the PDCCH transmitted by the second network device. If the terminal device monitors the PDCCH transmitted by the second network device by using the TCI state sets corresponding to a part of the n CORESETs, the manner in which a part of CORESET is determined from the n CORESETs may be implemented by the terminal device or may be indicated by the network device, for example, indication information corresponding to the part of the n CORESETs is indicated in the handover command.

Alternatively, in order to assist the second cell in configuring an appropriate TCI state set, the terminal device may carry beam measurement results of the second cell in a measurement report transmitted to the first cell, and the first cell may forward these beam measurement results to the second cell at the time of a handover request, thereby assisting the second cell in configuring an appropriate TCI state set, for example, several beams with better beam measurement results are selected as configured TCI states.

To sum up, in the technical solution provided by the embodiment, the terminal device uses the respective TCI state set configured for each CORESET of the at least one CORESET associated with the active BWP of the target cell to monitor the PDCCH transmitted by the target cell, so that it is avoided that the terminal device monitors the PDCCH on all receiving beams, and the purpose of saving power of the terminal device is achieved.

In addition, the solution of this embodiment is equivalent to the TCI state configured in the handover command being active state. Therefore, if the network device wants to use other TCI states later, it needs to be added through the RRC reconfiguration message.

Figure 9:
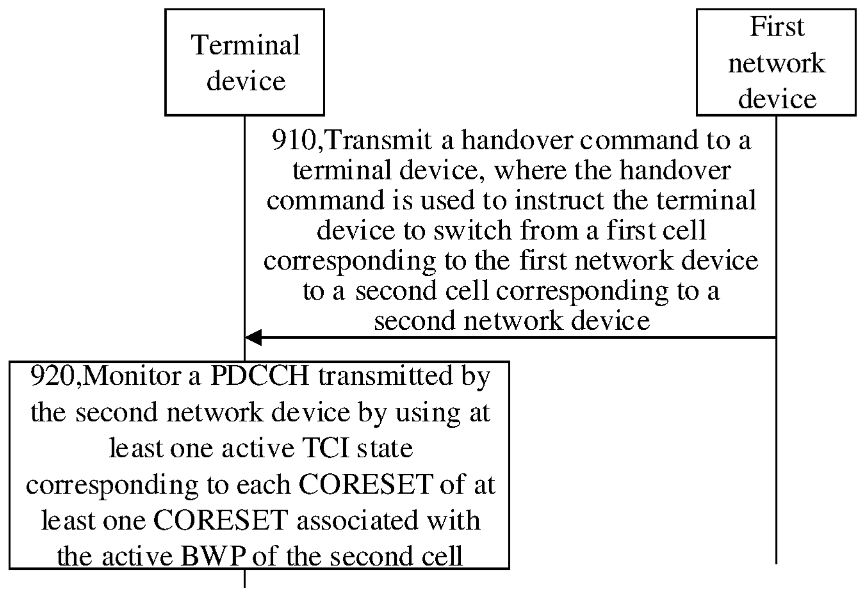
FIG. 9 is a flowchart of a method for monitoring a PDCCH according to another embodiment of the present disclosure.

Referring to FIG. 9, FIG. 9 illustrates a flowchart of a method for monitoring a PDCCH provided by another embodiment of the present disclosure. The method may be applied to the network architecture illustrated in FIG. 1. The method may include the following operations (910-920).

In operation 910, a first network device transmits a handover command to a terminal device. The handover command is used to instruct the terminal device to switch from a first cell corresponding to the first network device to a second cell corresponding to a second network device.

Accordingly, the terminal device receives the handover command transmitted by the first network device.

Alternatively, the handover command is transmitted in the form of an RRC message, and the first network device transmits the RRC message (such as an RRC reconfiguration message) to the terminal device. The RRC message includes the handover command (such as ReconfigurationWithSync).

Alternatively, the handover command further includes information for instructing the terminal device to perform the RACH-less handover procedure, such as RACH-less handover identification or RACH-skip information.

Alternatively, the handover command further includes configuration information of an active BWP of the second cell. The configuration information of the active BWP indicates information such as the active BWP, at least one CORESET associated with the active BWP, and a respective TCI state set configured for each CORESET of the at least one CORESET, and the like.

Alternatively, the handover command further includes configuration information of an initial BWP of the second cell. The configuration information of the initial BWP indicates information such as the initial BWP and a CORESET associated with the initial BWP, and the like.

In operation 920, the terminal device monitors a PDCCH transmitted by the second network device by using at least one active TCI state corresponding to each CORESET of at least one CORESET associated with the active BWP of the second cell.

Alternatively, the handover command further includes second information, and the second information indicates the at least one active TCI state.

Alternatively, the second information includes a bit sequence, and each bit of the bit sequence indicates that a TCI state corresponding to the bit is active or inactive. For example, the bit sequence $A_1$ includes four bits, where a bit value of 0 indicates that the TCI state corresponding to the bit is inactive, and a bit value of 1 indicates that the TCI state corresponding to the bit is active. If the content of the $A_1$ sequence is (0, 0, 0, 1), the TCI state with an index of 3 in the bit sequence $A_1$ is in an active state. For another example, the bit sequence $A_2$ includes five bits, where the bit value of 0 indicates that the TCI state corresponding to the bit is active, and the bit value of 1 indicates that the TCI state corresponding to the bit is inactive. If the content of the $A_2$ sequence is (1, 0, 1, 1, 1), the TCI state with index of 1 in the bit sequence $A_2$ is in the active state. In the above example, the indexes are numbered start from 0.

Alternatively, each CORESET has a respective second information, or at least two CORESETs share a same second information.

In an exemplary embodiment, it is assumed that the active BWP of the second cell is associated with two CORESETs (denoted CORESET #1 and CORESET #2), and the two CORESETs share the same second information. Taking the second information as a bit sequence as an example, and it is assumed that the second information is (1, 0, 0, 0), where 1 indicates active state and 0 indicates inactive state. The second information indicates that the first TCI state in the TCI state set corresponding to CORESET #1 is active and the first TCI state in the TCI state set corresponding to CORESET #2 is active, and the terminal device uses the two active TCI states to monitor PDCCH transmitted by the second network device.

In another exemplary embodiment, it is assumed that the active BWP of the second cell is associated with two CORESETs (denoted CORESET #1 and CORESET #2), the each of the two CORESETs has a respective second information. Taking the second information as a bit sequence as an example, it is assumed that the second information corresponding to CORESET #1 is (1, 0, 0, 0) and the second information corresponding to CORESET #2 is (0, 1, 0, 1), where 1 indicates active state and 0 indicates inactive state. These two pieces of second information indicate that the first TCI state in the TCI state set corresponding to CORESET #1 is active, and the second TCI state and the fourth TCI state in the TCI state set corresponding to CORESET #2 are active. The terminal device uses the three active TCI states to monitor the PDCCH transmitted by the second network device.

The description of the bit sequence in the above exemplary embodiments is for the purpose of example only and cannot represent a limitation of the bit sequence format.

Alternatively, in order to assist the second cell in activating an appropriate TCI state set, the terminal device may carry beam measurement results of the second cell in a measurement report transmitted to the first cell. The first cell may forward these beam measurement results to the second cell when transmitting the handover request, thereby assisting the second cell in activating an appropriate TCI state set, for example, several beams with better beam measurement results are selected as active TCI states.

To sum up, in the technical solution provided by the embodiment, the terminal device uses at least one active TCI state corresponding to each CORESET of at least one CORESET associated with the active BWP of the target cell to monitor the PDCCH transmitted by the target network device, so that it is avoided that the terminal device monitors the PDCCH on all receiving beams, and the purpose of saving power of the terminal device is achieved.

In addition, the solution of this embodiment has the advantage that the TCI states can be configured at one time compared with the solution of the embodiment of FIG. 8, and other TCI states that the network device wants to activate can be activated through the MAC CE, without adding corresponding TCI states through the RRC reconfiguration messages.

Figure 10:
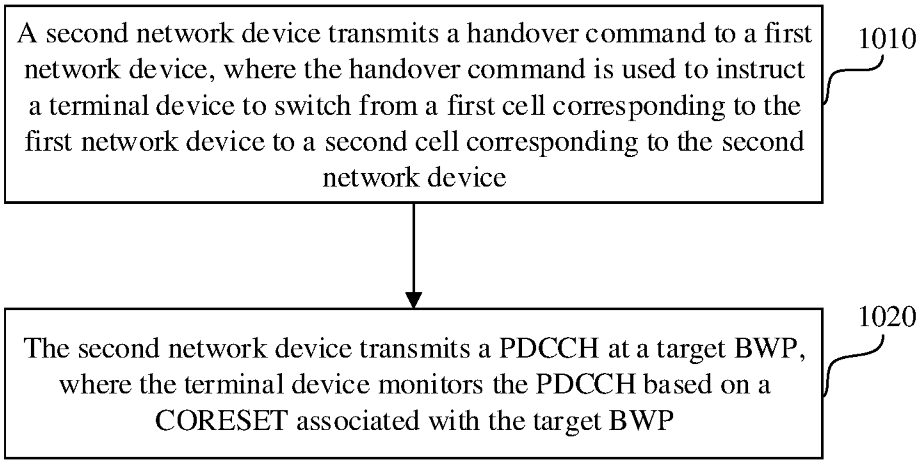
FIG. 10 is a flowchart of a method for monitoring a PDCCH according to another embodiment of the present disclosure.

Referring to FIG. 10, FIG. 10 illustrates a flowchart of a method for monitoring a PDCCH provided by another embodiment of the present disclosure. The method may be applied to the network architecture illustrated in FIG. 1. The method may include the following operations (1010-1020).

In operation 1010, a second network device transmits a handover command to a first network device. The handover command is used to instruct a terminal device to switch from a first cell corresponding to the first network device to a second cell corresponding to the second network device.

In operation 1020, the second network device transmits a PDCCH at a target BWP. The terminal device monitors the PDCCH based on a CORESET associated with the target BWP.

In one example, the target BWP is an initial BWP of the second cell. For an introductory description for the terminal device monitoring the PDCCH based on the CORESET associated with the initial BWP of the second cell, reference is made to the above embodiments and will not be repeated here.

In another example, the target BWP is the active BWP of the second cell. For an introductory description for the terminal device monitoring the PDCCH based on the CORESET associated with the active BWP of the second cell, reference is made to the above embodiments and will not be repeated here.

In an exemplary embodiment, the target BWP may be determined by the second network device. That is, it is determined by the second network device whether the target BWP is the initial BWP or the active BWP.

Alternatively, the second network device determines that the target BWP is the initial BWP of the second cell or the active BWP of the second cell according to the reference information. The reference information includes at least one of a service requirement, a BWP load, or a terminal type.

The second network device may determine the target BWP according to the service requirement. Because the bandwidth corresponding to the initial BWP is small and the service volume that can be carried is small, the second network device determines the initial BWP as the target BWP under the condition of small service requirement. Conversely, the second network device determines the active BWP as the target BWP when the service requirement is large.

The BWP load may be measured to some extent based on the number of terminal devices using the BWP. Alternatively, the second network device determines a BWP with a small load as the target BWP by comparing the load of the initial BWP with the load of the active BWP. For example, when the number of terminal devices using the initial BWP is 3 and the number of terminal devices using the active BWP is 30, the load of the initial BWP is small, and the second network device determines the initial BWP as the target BWP.

Exemplarily, the terminal types are distinguished according to the maximum transmitting powers of the terminal devices. According to the maximum transmitting powers, the terminal devices may be divided into the first type of terminal device (also called low-power terminal device, such as RedCap terminal device) and the second type of terminal device (also called ordinary terminal device). The maximum transmitting power of the low-power terminal device is very small, data transmission rate is slow, and the initial BWP with small bandwidth can meet its requirements. For example, the transmitting power of low-power terminal device is less than 20 dBm. The maximum transmitting power of the ordinary terminal device is large, data transmission rate is fast, so a large bandwidth is needed for data transmission. The second network device determines the initial BWP as the target BWP when determining that the terminal device is the low-power terminal device, and determines the active BWP as the target BWP when determining that the terminal device is the ordinary terminal device. For example, the second network device determines that the maximum transmitting power of the terminal device is 15 dBm through a handover request transmitted by the first network device, the terminal device is a low-power terminal device, and the second network device determines the initial BWP as the target BWP.

Alternatively, the handover command includes third information, and the third information is used to instruct the terminal device to monitor the PDCCH based on a CORESET associated with an initial BWP of the second cell or a CORESET associated with an active BWP of the second cell.

After the second network device determines the type of the target BWP, the third information may be configured in the handover command to indicate the target BWP for the terminal device monitoring the PDCCH. If the third information in the handover command indicates that the terminal device monitors the PDCCH by using the CORESET associated with the initial BWP, the terminal device monitors the PDCCH by using the CORESET associated with the initial BWP. If the third information in the handover command indicates that the terminal device monitors the PDCCH by using the CORESET associated with the active BWP, the terminal device monitors the PDCCH by using the CORESET associated with the active BWP. Alternatively, the third information may be represented by 1 bit. For example, 0 indicates that the second network device instructs the terminal device to monitor the PDCCH by using the CORESET associated with the initial BWP and 1 indicates that the second network device instructs the terminal device to monitor the PDCCH by using the CORESET associated with the active BWP.

In an exemplary embodiment, the number of terminal devices connected on the initial BWP of the second cell is 10, and the number of terminal devices connected on the active BWP is 2. The second network device determines that the load of active BWP is small, determines the active BWP as the target BWP, and writes the relevant configuration of the active BWP and third information in the handover command. The third information is one bit character, and the third information is used to instruct the terminal device to monitor the PDCCH by using the CORESET associated with the active BWP of the second cell.

Alternatively, in the case of determining that the target BWP is the active BWP of the second cell, the configuration information of the active BWP of the second cell is added to the handover command. Alternatively, in the case of determining that the target BWP is the initial BWP of the second cell, the configuration information of the active BWP of the second cell is not added to the handover command.

If the second network device determines that the target BWP is the active BWP of the second cell, the second network device configures the relevant information of the active BWP in the handover command, the relevant information of the active BWP includes at least one or more TCI state sets corresponding to the CORESET associated with the active BWP. In addition, the relevant information of the active BWP may further include the first information and/or the second information described above. If the second network device determines that the target BWP is the initial BWP of the second cell, the second network device does not add the configuration information of the active BWP of the second cell to the handover command. Alternatively, the second network device adds the configuration information of the initial BWP of the second cell to the handover command in a case that the configuration information of the active BWP of the second cell is not added to the handover command, the terminal device determines the initial BWP of the second cell based on the configuration information of the initial BWP in the handover command, and monitors the PDCCH transmitted by the second network device by using the CORESET associated with the initial BWP. Alternatively, the second network device does not add the configuration information of the initial BWP of the second cell in the handover command in a case that the configuration information of the active BWP of the second cell is not added in the handover command. After receiving the handover command, the terminal device finds that there is no configuration information of the initial BWP or configuration information of the active BWP in the handover command. According to the Delta configuration principle, the terminal device determines the initial BWP of the first cell as the initial BWP of the second cell, and monitors the PDCCH transmitted by the second network device by using the CORESET associated with the initial BWP.

For example, the second network device determines that the maximum transmitting power of the terminal device is 31 dBm through the handover request transmitted by the first network device, and the terminal device is an ordinary terminal device. The second network device determines the active BWP as the target BWP, and adds the configuration information of the active BWP of the second cell to the handover command. The terminal device monitors the PDCCH through the CORESET associated with the active BWP of the second cell.

For another example, when the second network device determines that the service requirement is small, determines the initial BWP as the target BWP, and determines that the target BWP is the initial BWP of the second cell, the configuration information of the active BWP of the second cell is not added to the handover command, and the configuration information of the initial BWP is not added to the handover command. After receiving the handover command, the terminal device determines that the handover command does not include the configuration information of the active BWP and the handover command does not include the configuration information of the initial BWP. The terminal device takes the configuration information of the initial BWP of the first cell as the initial BWP information of the second cell, and the terminal device monitors the PDCCH transmitted by the second terminal device by using the CORESET associated with the initial BWP.

In the above embodiments, for the specific processes of the first network device forwarding the handover command and the terminal device using the configuration information of the target BWP to monitor the PDCCH, the reference is made to the embodiments on the terminal device side, and will not be described here.

It should be noted that the description of reference information such as the service requirement, the BWP load, the terminal type, and third information in the above exemplary embodiments is for the purpose of example only and is not intended to limit the form and content of the above information.

To sum up, in the technical solution provided by the embodiment of the present disclosure, the second network device generates the handover command, the first network device forwards the handover command, and after receiving the handover command, the terminal device monitors the PDCCH transmitted by the target cell based on the CORESET associated with the target BWP of the target cell, so that the terminal device can accurately monitor the PDCCH, thereby obtaining an available uplink resource from the PDCCH to transmit the handover completion message and improving the handover success rate.

In addition, the embodiment provides a method for the second network device to determine the target BWP through the reference information. The second network device can flexibly determine the target BWP through the reference information, which is helpful to rationally utilize the BWP resources and enables the terminal device to match with the target BWP in the handover command.

It should be noted that in the above content, the technical solutions of the present disclosure are introduced and explained only from the point of view of the interaction among the terminal device, the first network device and the second network device. The operations performed by the terminal device can be independently realized as the method for monitoring the PDCCH on the terminal device side, the operations performed by the first network device can be independently realized as the method for monitoring the PDCCH on the first network device side, and the operations performed by the second network device can be independently realized as the method for monitoring the PDCCH on the second network device side.

The following is embodiments of the apparatus of the present disclosure, which can be used to perform the embodiments of the methods of the present disclosure. For details not disclosed in the apparatus embodiments of the present disclosure, the reference is made to the method embodiments of the present disclosure.

Figure 11:
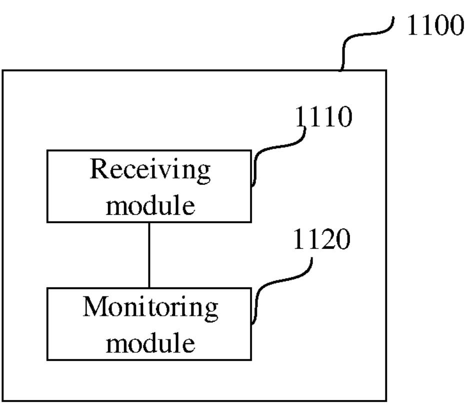
FIG. 11 is a block diagram of an apparatus for monitoring a PDCCH provided by an embodiment of the present disclosure.

Referring to FIG. 11, FIG. 11 illustrates a block diagram of an apparatus for monitoring a PDCCH provided by one embodiment of the present disclosure. The apparatus has a function of realizing the method example of the terminal device side described above, and the function may be realized by hardware or by executing corresponding software by hardware. The apparatus may be the terminal device described above, or may be arranged in the terminal device. As illustrated in FIG. 11 the apparatus 1100 may include a receiving module 1110 and a monitoring module 1120.

The receiving module 1110 is configured to receive a handover command transmitted by a first network device. The handover command is used to instruct a terminal device to switch from a first cell corresponding to the first network device to a second cell corresponding to a second network device.

The monitoring module 1120 is configured to monitor, based on a CORESET associated with a target BWP of the second cell, a PDCCH transmitted by the second network device.

Alternatively, the target BWP is an initial BWP of the second cell.

Alternatively, the monitoring module 1120 is configured to in a case of determining that the PDCCH is monitored based on a CORESET associated with the initial BWP of the second cell, receive a PDCCH transmitted by the second network device on all receiving beams of the terminal device by using a manner of beam sweeping.

Alternatively, the monitoring module 1120 is configured to in a case of determining that the PDCCH is monitored based on a CORESET associated with the initial BWP of the second cell, determine, according to a beam measurement result, at least one target receiving beam from all receiving beams of the terminal device; and receive, on the at least one target receiving beam, the PDCCH transmitted by the second network device.

Alternatively, the apparatus 1100 further includes a determination module (not illustrated in FIG. 11). The determination module is configured to in a case that the handover command includes configuration information of the initial BWP of the second cell, determine the initial BWP of the second cell according to the configuration information of the initial BWP of the second cell; or in a case that the handover command does not include configuration information of the initial BWP of the second cell, determine an initial BWP of the first cell as the initial BWP of the second cell.

Alternatively, the target BWP is an active BWP of the second cell.

Alternatively, the handover command includes configuration information of the active BWP of the second cell, and the configuration information of the active BWP indicates the active BWP, at least one CORESET associated with the active BWP, and a respective TCI state set configured for each CORESET of the at least one CORESET.

Alternatively, the monitoring module 1120 is configured to monitor the PDCCH transmitted by the second network device by using a respective TCI state set configured for each CORESET of at least one CORESET associated with the active BWP of the second cell.

Alternatively, the behavior of the terminal device monitoring the PDCCH by using the configured TCI state set is prescribed by the protocol.

Alternatively, in response to the handover command including configuration information of the active BWP of the second cell, the terminal device monitors the PDCCH by using the configured TCI state set.

Alternatively, the behavior of the terminal device monitoring the PDCCH by using the configured TCI state set is configured by the network.

Alternatively, the handover command further includes first information, and the first information indicates whether the terminal device uses the configured TCI state set to monitor the PDCCH.

Alternatively, the monitoring module 1120 is configured to monitor the PDCCH transmitted by the second network device by using at least one active TCI state corresponding to each CORESET of at least one CORESET associated with the active BWP of the second cell.

Alternatively, the handover command further includes second information, and the second information indicates the at least one active TCI state.

Alternatively, the second information includes a bit sequence, and each bit of the bit sequence indicates that a TCI state corresponding to the bit is active or inactive.

Alternatively, each CORESET has a respective second information, or at least two CORESETs share a same second information.

Alternatively, the handover command is a RACH-less handover command, and the RACH-less handover command is used to instruct the terminal device to perform a RACH-less handover procedure.

Alternatively, the receiving module 1110 is configured to receive a RRC message transmitted by a first network device. The RRC message includes information for instructing the terminal device to perform the RACH-less handover procedure.

Alternatively, the handover command includes third information, and the third information is used to instruct the terminal device to monitor the PDCCH based on a CORESET associated with an initial BWP of the second cell or a CORESET associated with an active BWP of the second cell.

Alternatively, in a case that the handover command includes configuration information of an active BWP of the second cell, the terminal device monitors, based on a CORESET associated with the active BWP of the second cell, the PDCCH transmitted by the second network device.

Alternatively, in a case that the handover command does not include the configuration information of the active BWP of the second cell, the terminal device monitors, based on a CORESET associated with an initial BWP of the second cell, the PDCCH transmitted by the second network device.

Alternatively, the second network device determines, according to reference information, that the target BWP is an initial BWP of the second cell or an active BWP of the second cell, and the reference information includes at least one of a service requirement, a BWP load, or a terminal type.

To sum up, the technical solution provided by the embodiment, after receiving the handover command, the terminal device monitors the PDCCH transmitted by the target cell based on the CORESET associated with the target BWP of the target cell, so that the terminal device can accurately monitor the PDCCH, thereby obtaining an available uplink resource from the PDCCH to transmit the handover completion message and improving the handover success rate.

Figure 12:
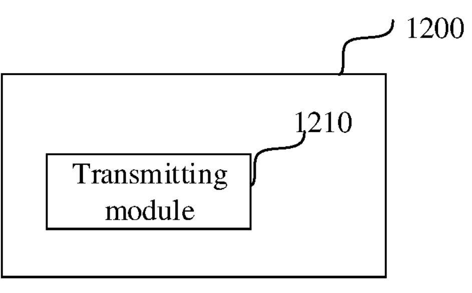
FIG. 12 is a block diagram of an apparatus for monitoring a PDCCH provided by another embodiment of the present disclosure.

Referring to FIG. 12, FIG. 12 illustrates a block diagram of an apparatus for monitoring a PDCCH provided by another embodiment of the present disclosure. The apparatus has a function of realizing the method example of the first network device side described above, and the function can be realized by hardware or by executing corresponding software by hardware. The apparatus may be the first network device described above or may be arranged in the first network device. As illustrated in FIG. 12, the apparatus 1200 may include a transmitting module 1210.

The transmitting module 1210 is configured to transmit a handover command to a terminal device. The handover command is used to instruct the terminal device to switch from a first cell corresponding to a first network device to a second cell corresponding to a second network device.

The terminal device monitors the PDCCH transmitted by the second network device based on a CORESET associated with a target BWP of the second cell.

Alternatively, the target BWP is an initial BWP of the second cell.

Alternatively, the terminal device receives a PDCCH transmitted by the second network device on all receiving beams of the terminal device by using a manner of beam sweeping.

Alternatively, the terminal device determines at least one target receiving beam from all receiving beams of the terminal device according to a beam measurement result, and receives the PDCCH transmitted by the second network device on the target receiving beam.

Alternatively, in a case that the handover command includes configuration information of the initial BWP of the second cell, the terminal device determines the initial BWP of the second cell according to the configuration information of the initial BWP of the second cell. Alternatively, in a case that the handover command does not include configuration information of the initial BWP of the second cell, the terminal device determines an initial BWP of the first cell as the initial BWP of the second cell.

Alternatively, the target BWP is an active BWP of the second cell.

Alternatively, the handover command includes configuration information of the active BWP of the second cell, and the configuration information of the active BWP indicates the active BWP, at least one CORESET associated with the active BWP, and a respective TCI state set configured for each CORESET of the at least one CORESET.

Alternatively, the terminal device monitors the PDCCH transmitted by the second network device by using a respective TCI state set configured for each CORESET of at least one CORESET associated with the active BWP of the second cell.

Alternatively, the behavior of the terminal device monitoring the PDCCH by using the configured TCI state set is prescribed by the protocol.

Alternatively, in response to the handover command including configuration information of the active BWP of the second cell, the terminal device monitors the PDCCH by using the configured TCI state set.

Alternatively, the behavior of the terminal device monitoring the PDCCH by using the configured TCI state set is configured by the network.

Alternatively, the handover command further includes first information, and the first information indicates whether the terminal device uses the configured TCI state set to monitor the PDCCH.

Alternatively, the terminal device monitors the PDCCH transmitted by the second network device by using at least one active TCI state corresponding to each CORESET of at least one CORESET associated with the active BWP of the second cell.

Alternatively, the handover command further includes second information, and the second information indicates the at least one active TCI state.

Alternatively, the second information includes a bit sequence, and each bit of the bit sequence indicates that a TCI state corresponding to the bit is active or inactive.

Alternatively, each CORESET has a respective second information, or at least two CORESETs share a same second information.

Alternatively, the handover command is a RACH-less handover command, and the RACH-less handover command is used to instruct the terminal device to perform a RACH-less handover procedure.

Alternatively, the transmitting module 1210 is configured to transmit a RRC message to the terminal device. The RRC message includes information for instructing the terminal device to perform the RACH-less handover procedure.

To sum up, in the technical solution provided by the embodiment of the present disclosure, after receiving the handover command, the terminal device monitors the PDCCH transmitted by the target cell based on the CORESET associated with the target BWP of the target cell, so that the terminal device can accurately monitor the PDCCH, thereby obtaining an available uplink resource from the PDCCH to transmit the handover completion message and improving the handover success rate.

Figure 13:
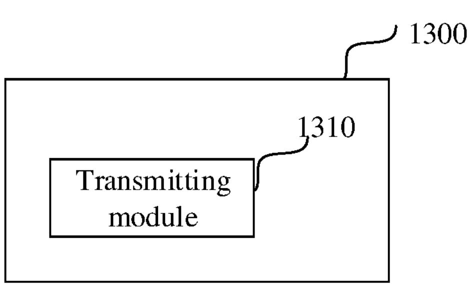
FIG. 13 is a block diagram of an apparatus for monitoring a PDCCH provided by another embodiment of the present disclosure.

Referring to FIG. 13, FIG. 13 is a block diagram of an apparatus for monitoring a PDCCH provided by another embodiment of the present disclosure. The apparatus has a function of realizing the method example of the second network device side described above, and the function can be realized by hardware or by executing corresponding software by hardware. The apparatus may be the second network device described above or may be arranged in the second network device. As illustrated in FIG. 13, the apparatus 1300 may include a transmitting module 1310.

The transmitting module 1310 is configured to transmit a handover command to a first network device. The handover command is used to instruct a terminal device to switch from a first cell corresponding to the first network device to a second cell corresponding to a second network device.

The transmitting module 1310 is configured to transmit a PDCCH on a target BWP. The terminal device monitors the PDCCH based on a CORESET associated with the target BWP.

Alternatively, the target BWP is an initial BWP of the second cell.

Alternatively, the handover command includes configuration information of the active BWP of the second cell, and the configuration information of the active BWP indicates the active BWP, at least one CORESET associated with the active BWP, and a respective TCI state set configured for each CORESET of the at least one CORESET.

Alternatively, the terminal device monitors the PDCCH transmitted by the second network device by using a respective TCI state set configured for each CORESET of at least one CORESET associated with the active BWP of the second cell.

Alternatively, in response to the handover command including configuration information of the active BWP of the second cell, the terminal device monitors the PDCCH by using the configured TCI state set.

Alternatively, the handover command further includes first information, and the first information indicates whether the terminal device uses the configured TCI state set to monitor the PDCCH.

Alternatively, the terminal device monitors the PDCCH transmitted by the second network device by using at least one active TCI state corresponding to each CORESET of at least one CORESET associated with the active BWP of the second cell.

Alternatively, the handover command further includes second information, and the second information indicates the at least one active TCI state.

Alternatively, the second information includes a bit sequence, and each bit of the bit sequence indicates that a TCI state corresponding to the bit is active or inactive.

Alternatively, each CORESET has a respective second information.

Alternatively, at least two CORESETs share a same second information.

Alternatively, the handover command is a RACH-less handover command, and the RACH-less handover command is used to instruct the terminal device to perform a RACH-less handover procedure.

Alternatively, the apparatus further includes a determination module (not illustrated in FIG. 13).

The determination module is configured to determine, according to reference information, that the target BWP is an initial BWP of the second cell or an active BWP of the second cell. The reference information includes at least one of a service requirement, a BWP load, or a terminal type.

Alternatively, the handover command includes third information, and the third information is used to instruct the terminal device to monitor the PDCCH based on a CORESET associated with an initial BWP of the second cell or a CORESET associated with an active BWP of the second cell.

Alternatively, the apparatus further includes an adding module (not illustrated in FIG. 13).

The adding module is configured to in a case of determining that the target BWP is an active BWP of the second cell, add configuration information of the active BWP of the second cell to the handover command, or in a case of determining that the target BWP is an initial BWP of the second cell, not add the configuration information of the active BWP of the second cell to the handover command.

To sum up, in the technical solution provided by the embodiment of the present disclosure, after receiving the handover command, the terminal device monitors the PDCCH transmitted by the target cell based on the CORESET associated with the target BWP of the target cell, so that the terminal device can accurately monitor the PDCCH, thereby obtaining an available uplink resource from the PDCCH to transmit the handover completion message and improving the handover success rate.

It should be noted that when the apparatus provided in the embodiments realizes its function, the division of various function modules is given as an example. In practical application, the above functions can be completed by different function modules according to actual needs, that is, the content structure of the apparatus is divided into different function modules to complete all or part of the functions described above.

With regard to the apparatus in the above embodiments, the specific manner in which the respective modules perform operations has been described in detail in the embodiments relating to the methods, and will not be explained in detail herein.

Figure 14:
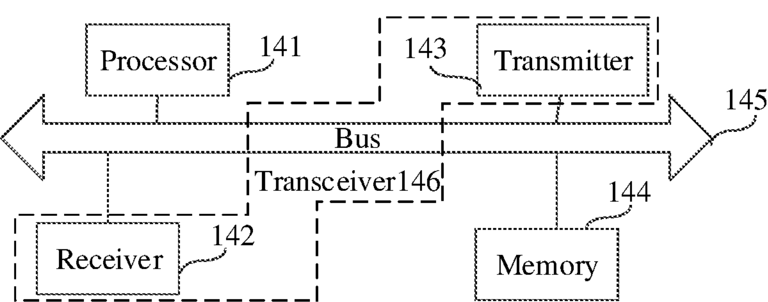
FIG. 14 is a schematic structural diagram of a terminal device provided by an embodiment of the present disclosure.

Referring to FIG. 14, FIG. 14 illustrates a block diagram of a terminal device 140 provided by one embodiment of the present disclosure. For example, the terminal device 140 may be used to perform the method for monitoring a PDCCH on the terminal device side described above. Specifically, the terminal device 140 may include a processor 141, a receiver 142, a transmitter 143, a memory 144 and a bus 145.

The processor 141 includes one or more processing cores and performs various functional applications and information processing by running software programs and modules.

The receiver 142 and transmitter 143 may be implemented as a transceiver 146, and the transceiver 146 may be a communication chip.

The memory 144 is connected to the processor 141 through the bus 145.

The memory 144 may be used to store a computer program and the processor 141 is used to execute the computer program to implement the various operations performed by the terminal device in the above-described method embodiments.

In addition, the memory 144 may be implemented by any type of volatile storage device or non-volatile storage device, or a combination of the volatile storage device or the non-volatile storage device. The volatile storage device or non-volatile storage device includes but not limited to: a Random Access Memory (RAM) and a Read-Only Memory (ROM), an Erasable Programmable Read-Only Memory (EPROM), an Electrically Erasable Programmable Read-Only Memory (EEPROM), a flash memory or other solid-state storage technology, a Compact Disc Read-Only Memory (CD-ROM), or a Digital Video Disc (DVD) or other optical storage, cassette, magnetic tape, magnetic disk storage or other magnetic storage devices.

Alternatively, the transceiver 146 is configured to receive a handover command transmitted by the first network device, and the handover command is used to instruct the terminal device to switch from the first cell corresponding to the first network device to the second cell corresponding to the second network device.

The transceiver 146 is further configured to monitor the PDCCH transmitted by the second network device based on the CORESET associated with the target BWP of the second cell.

For details not described in detail in the above embodiments, reference is made to the introduction in the above method embodiments, which will not be repeated here.

Figure 15:
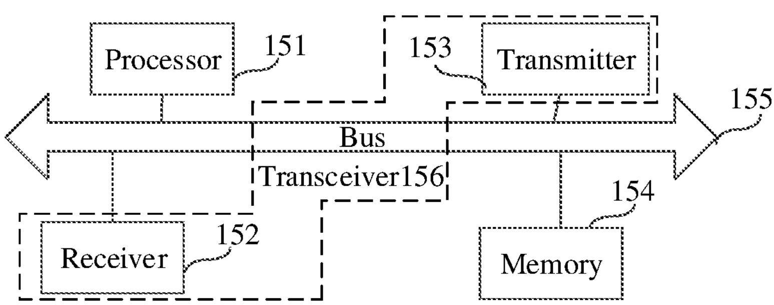
FIG. 15 is a schematic structural diagram of a network device provided by an embodiment of the present disclosure.

Referring to FIG. 15, FIG. 15 illustrates a block diagram of a network device 150 provided by one embodiment of the present disclosure. For example, the network device 150 may be used to perform the method for monitoring a PDCCH on the first network device side or the second network device side described above. Specifically, the network device 150 may include a processor 151, a receiver 152, a transmitter 153, a memory 154 and a bus 155.

The processor 151 includes one or more processing cores and performs various functional applications and information processing by running software programs and modules.

The receiver 152 and the transmitter 153 may be implemented as a transceiver 156, and the transceiver 156 may be a communication chip.

The memory 154 is connected to the processor 151 through the bus 155.

The memory 154 may be used to store a computer program and the processor 151 is used to execute the computer program to implement the various operations performed by the first network device or the second network device in the above-described method embodiments.

In addition, the memory 154 may be implemented by any type of volatile storage device or non-volatile storage device, or a combination of the volatile storage device or the non-volatile storage device. The volatile storage device or non-volatile storage device includes but not limited to: a RAM and a ROM, an EPROM, an EEPROM, a flash memory or other solid-state storage technology, a CD-ROM, or a DVD or other optical storage, cassette, magnetic tape, magnetic disk storage or other magnetic storage devices.

In an exemplary embodiment, in a case that the network device 150 is the first network device, the transceiver 156 is configured to transmit a handover command to the terminal device. The handover command is used to instruct the terminal device to switch from a first cell corresponding to the first network device to a second cell corresponding to the second network device.

The terminal device monitors the PDCCH transmitted by the second network device based on the CORESET associated with the target BWP of the second cell.

In an exemplary embodiment, in a case that the network device 150 is the second network device, the transceiver 156 is configured to transmit a handover command. The handover command is used to instruct the terminal device to switch from a first cell corresponding to the first network device to a second cell corresponding to the second network device;

The transceiver 156 is further configured to transmit a PDCCH on a target BWP. The terminal device monitors the PDCCH based on a CORESET associated with the target BWP.

Alternatively, the processor 151 is configured to determine, according to the reference information, that the target BWP is the initial BWP of the second cell or the active BWP of the second cell. The reference information includes at least one of a service requirement, a BWP load, or a terminal type.

For details not described in detail in the above embodiments, reference is made to the introduction in the above method embodiments, which will not be repeated here.

The embodiment of the present disclosure also provides a computer-readable storage medium in which a computer program is stored, and the computer program is used for being executed by a processor of the device to implement the above method for monitoring a PDCCH.

Alternatively, the computer-readable storage medium may include a ROM, a RAM, an SSD, an optical disk, or the like. The RAM may include a Resistance Random Access Memory (ReRAM) and a Dynamic Random Access Memory (DRAM).

The embodiment of the present disclosure further provides a chip. The chip includes a programmable logic circuit and/or a program instruction, which is used for implementing the above method for monitoring a PDCCH when the chip is running on the device.

The embodiment of the present disclosure further provides a computer program product or computer program, and the computer program product or computer program includes computer instructions. The computer instructions are stored in a computer readable storage medium from which a processor of a device reads and executes the computer instructions to implement the above method for monitoring a PDCCH.

The embodiments of the present disclosure provide a method for monitoring a PDCCH, an apparatus, a device and a storage medium. The technical solutions are as follows.

According to an aspect of the embodiments of the present disclosure, a method for monitoring a PDCCH is provided. The method is performed by a terminal device and the method includes the following operations.

A handover command transmitted by a first network device is received. The handover command is used to instruct the terminal device to switch from a first cell corresponding to the first network device to a second cell corresponding to a second network device.

The PDCCH transmitted by the second network device is monitored based on a Control Resource Set (CORESET) associated with a target Bandwidth Part (BWP) of the second cell.

According to an aspect of the embodiments of the present disclosure, a method for monitoring a PDCCH is provided. The method is performed by a first network device, and the method includes the following operations.

A handover command is transmitted to a terminal device. The handover command is used to instruct the terminal device to switch from a first cell corresponding to the first network device to a second cell corresponding to a second network device.

The terminal device monitors a PDCCH transmitted by the second network device based on a CORESET associated with a target BWP of the second cell.

According to an aspect of the embodiments of the present disclosure, a method for monitoring a PDCCH is provided. The method is performed by a second network device, and the method includes the following operations.

A handover command is transmitted to a first network device. The handover command is used to instruct a terminal device to switch from a first cell corresponding to the first network device to a second cell corresponding to the second network device.

A PDCCH is transmitted on a target BWP. The terminal device monitors the PDCCH based on a CORESET associated with the target BWP.

According to an aspect of the embodiments of the present disclosure, an apparatus for monitoring a PDCCH is provided. The apparatus includes a receiving module and a monitoring module.

The receiving module is configured to receive a handover command transmitted by a first network device. The handover command is used to instruct a terminal device to switch from a first cell corresponding to the first network device to a second cell corresponding to a second network device.

The monitoring module is configured to monitor, based on a CORESET associated with a target BWP of the second cell, a PDCCH transmitted by the second network device.

According to an aspect of the embodiments of the present disclosure, an apparatus for monitoring a PDCCH is provided. The apparatus includes a transmitting module.

The transmitting module is configured to transmit a handover command to a terminal device. The handover command is used to instruct the terminal device to switch from a first cell corresponding to a first network device to a second cell corresponding to a second network device.

The terminal device monitors a PDCCH transmitted by the second network device based on a CORESET associated with a target BWP of the second cell.

According to an aspect of the embodiments of the present disclosure, an apparatus for monitoring a PDCCH is provided. The apparatus includes a transmitting module.

The transmitting module is configured to transmit a handover command to a first network device. The handover command is used to instruct a terminal device to switch from a first cell corresponding to the first network device to a second cell corresponding to a second network device.

The transmitting module is further configured to transmit a PDCCH on a target BWP. The terminal device monitors the PDCCH based on a CORESET associated with the target BWP.

According to an aspect of the embodiments of the present disclosure, a terminal device is provided. The terminal device includes a processor and a memory. The memory stores a computer program, and the processor executes the computer program to implement the method for monitoring the PDCCH on the terminal device side.

According to an aspect of the embodiments of the present disclosure, a network device is provided. The network device includes a processor and a memory. The memory stores a computer program, and the processor executes the computer program to implement the method for monitoring the PDCCH on the first network device side or the method for monitoring the PDCCH on the second network device side.

According to an aspect of the embodiments of the present disclosure, a computer readable storage medium having a computer program stored therein is provided. The computer program is executed by a processor to implement the method for monitoring the PDCCH described above.

According to an aspect of the embodiments of the present disclosure, a chip including a programmable logic circuitry and/or program instructions is provided. The method for monitoring the PDCCH described above is implemented when the chip is running.

According to an aspect of the embodiments of the present disclosure, a computer program product or a computer program is provided. The computer program product or computer program includes computer instructions stored in a computer-readable storage medium. A processor reads and executes the computer instructions from the computer-readable storage medium to implement the method for monitoring the PDCCH described above.

The technical solutions provided by the embodiments of the present disclosure may include the following beneficial effects.

After receiving the handover command, the terminal device monitors the PDCCH transmitted by the target cell based on the CORESET associated with the target BWP of the target cell, so that the terminal device can accurately monitor the PDCCH, thereby obtaining an available uplink resource from the PDCCH to transmit the handover completion message and improving the handover success rate.

It should be understood that the reference to "indication" in embodiments of the present disclosure may be a direct indication, may be an indirect indication, or may be indicative of an association relationship. For example, A indicates B, which may mean that A directly indicates B, for example, B may be obtained through A, which may also mean that A indirectly indicates B, for example, A indicates C, and B may be obtained by C, which may also indicate that there is an association relationship between A and B.

In the description of embodiments of the present disclosure, the term "correspondence" may mean that there is a direct correspondence or an indirect correspondence relationship between the two objects, may also mean that there is an association relationship between the two objects, may also be a relationship between indication and being indicated, configuration and being configured, etc.

In the present disclosure, "multiple" refers to two or more. "And/or" describes the association relationship of associated objects, means that there may be three relationships, for example, A and/or B, which may mean that there are three situations: A exists alone, A and B exist at the same time, and B exist alone. The character "/" generally indicates that there is an "or" relationship between the related objects.

In addition, the numbers of operations described in the present disclosure only exemplify a possible sequence of execution of the operations, and in some other embodiments, the above operations may also be performed not in the sequence of numbers, for example, two different numbered operations are performed simultaneously, or two different numbered operations are performed in the reverse sequence to the illustration, which is not limited by the embodiments of the present disclosure.

Those skilled in the art will appreciate that in one or more of the above examples, the functions described in embodiments of the present disclosure may be implemented in hardware, software, firmware or any combination thereof. When implemented in software, these functions may be stored in a computer-readable medium or transmitted as one or more instructions or codes in the computer-readable medium. The computer-readable medium includes a computer storage medium and a communication medium. The communication medium includes any medium that facilitates the transfer of a computer program from one place to another place. The storage medium may be any available medium accessible to a general-purpose or special-purpose computer.

The above description is only an exemplary embodiment of the present disclosure and is not intended to limit the present disclosure. Any modification, equivalent replacement, improvement, etc. made within the spirit and principles of the present disclosure shall be included in the scope of protection of the present disclosure.

What is claimed is:

1. A method for monitoring a Physical Downlink Control Channel (PDCCH), performed by a terminal device, the method comprising:

receiving a handover command transmitted by a first network device, wherein the handover command is used to instruct the terminal device to switch from a first cell corresponding to the first network device to a second cell corresponding to a second network device; and monitoring, based on a Control Resource Set (CORESET) associated with a target Bandwidth Part (BWP) of the second cell, a PDCCH transmitted by the second network device;

wherein the target BWP is an active BWP of the second cell; and monitoring, based on the CORESET associated with the target BWP of the second cell, the PDCCH transmitted by the second network device comprises:

monitoring the PDCCH transmitted by the second network device by using at least one active Transmission Configuration Indicator (TCI) state corresponding to each CORESET of at least one CORESET associated with the active BWP of the second cell.

2. The method of claim 1, wherein the handover command comprises configuration information of the active BWP of the second cell, and the configuration information of the active BWP indicates the active BWP, at least one CORESET associated with the active BWP, and a respective TCI state set configured for each CORESET of the at least one CORESET.

3. The method of claim 1, wherein the handover command further comprises second information, and the second information indicates the at least one active TCI state.

4. The method of claim 3, wherein each CORESET has a respective second information; or at least two CORESETs share a same second information.

5. The method of claim 1, wherein the handover command is a Random Access Channel-less (RACH-less) handover command, and the RACH-less handover command is used to instruct the terminal device to perform a RACH-less handover procedure.

6. The method of claim 5, wherein receiving the handover command transmitted by the first network device comprises:

receiving a Radio Resource Control (RRC) message transmitted by a first network device, wherein the RRC message comprises information for instructing the terminal device to perform the RACH-less handover procedure.

7. A terminal device, comprising:

a transceiver, configured to receive a handover command transmitted by a first network device, wherein the handover command is used to instruct a terminal device to switch from a first cell corresponding to the first network device to a second cell corresponding to a second network device; and a processor, configured to monitor, based on a Control Resource Set (CORESET) associated with a target Bandwidth Part (BWP) of the second cell, a Physical Downlink Control Channel (PDCCH) transmitted by the second network device;

wherein the target BWP is an active BWP of the second cell, and the processor is configured to:

monitor the PDCCH transmitted by the second network device by using at least one active Transmission Configuration Indicator (TCI) state corresponding to each CORESET of at least one CORESET associated with the active BWP of the second cell.

8. The terminal device of claim 7, wherein the handover command further comprises second information, and the second information indicates the at least one active TCI state.

9. The terminal device of claim 8, wherein each CORESET has a respective second information; or at least two CORESETs share a same second information.

10. The terminal device of claim 7, wherein the handover command is a Random Access Channel-less (RACH-less) handover command, and the RACH-less handover command is used to instruct the terminal device to perform a RACH-less handover procedure.

11. The terminal device of claim 10, wherein receiving the handover command transmitted by the first network device comprises:

receiving a Radio Resource Control (RRC) message transmitted by a first network device, wherein the RRC message comprises information for instructing the terminal device to perform the RACH-less handover procedure.

12. A first network device, comprising:

a processor;

a memory, configured to store a computer program executable by the processor; and a transceiver, configured to transmit a handover command to a terminal device, wherein the handover command is used to instruct the terminal device to switch from a first cell corresponding to a first network device to a second cell corresponding to a second network device;

wherein the terminal device monitors a Physical Downlink Control Channel (PDCCH) transmitted by the second network device based on a Control Resource Set (CORESET) associated with a target Bandwidth Part (BWP) of the second cell;

wherein the target BWP is an active BWP of the second cell, and the terminal device monitors the PDCCH transmitted by the second network device by using at least one active Transmission Configuration Indicator (TCI) state corresponding to each CORESET of at least one CORESET associated with the active BWP of the second cell.

13. The first network device of claim 12, wherein the handover command further comprises second information, and the second information indicates the at least one active TCI state.

14. The first network device of claim 13, wherein each CORESET has a respective second information; or at least two CORESETs share a same second information.

15. The first network device of claim 12, wherein the handover command is a Random Access Channel-less (RACH-less) handover command, and the RACH-less handover command is used to instruct the terminal device to perform a RACH-less handover procedure.

16. The first network device of claim 15, wherein, the transceiver is configured to transmit a Radio Resource Control (RRC) message to the terminal device, wherein the RRC message comprises information for instructing the terminal device to perform the RACH-less handover procedure.

17. The method of claim 1, wherein the handover command comprises configuration information of the active BWP of the second cell, and the configuration information of the active BWP indicates the active BWP, at least one CORESET associated with the active BWP, and a respective Transmission Configuration Indicator (TCI) state set configured for each CORESET of the at least one CORESET.

18. The method of claim 3, wherein the second information comprises a bit sequence, and each bit of the bit sequence indicates that a TCI state corresponding to the bit is active or inactive.

19. The terminal device of claim 7, wherein the handover command comprises configuration information of the active BWP of the second cell, and the configuration information of the active BWP indicates the active BWP, at least one CORESET associated with the active BWP, and a respective Transmission Configuration Indicator (TCI) state set configured for each CORESET of the at least one CORESET.

20. The terminal device of claim 8, wherein the second information comprises a bit sequence, and each bit of the bit sequence indicates that a TCI state corresponding to the bit is active or inactive.

* * * * *